(12) United States Patent
Sharma et al.

(10) Patent No.: US 11,295,725 B2
(45) Date of Patent: Apr. 5, 2022

(54) SELF-TRAINING WAVENET FOR TEXT-TO-SPEECH

(71) Applicant: Google LLC, Mountain View, CA (US)

(72) Inventors: Manish Sharma, London (GB); Tom Marius Kenter, London (GB); Robert Clark, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/925,230

(22) Filed: Jul. 9, 2020

(65) Prior Publication Data

US 2022/0013105 A1 Jan. 13, 2022

(51) Int. Cl.
*G10L 13/047* (2013.01)
*G10L 25/30* (2013.01)

(52) U.S. Cl.
CPC ........... *G10L 13/047* (2013.01); *G10L 25/30* (2013.01)

(58) Field of Classification Search
CPC ............................. G10L 13/047; G10L 25/30
USPC ....................................................... 704/260
See application file for complete search history.

(56) References Cited

U.S. PATENT DOCUMENTS 5,912,194 A * 6/1999 Everhart ............. D06M 23/005
442/118
2019/0180732 A1* 6/2019 Ping .................... G06F 9/30003
2019/0236447 A1* 8/2019 Cohen ....................... G06N 5/02
2020/0066253 A1* 2/2020 Peng ....................... G06N 3/088
2021/0182662 A1* 6/2021 Lai ......................... G06F 40/284

FOREIGN PATENT DOCUMENTS

CN 110546656 A * 12/2019 ............... G06N 3/04

OTHER PUBLICATIONS

Y. Zhao, X. Xia and R. Togneri, "Applications of Deep Learning to Audio Generation," in IEEE Circuits and Systems Magazine, vol. 19, No. 4, pp. 19-38, Fourthquarter 2019, doi: 10.1109/MCAS.2019.2945210. (Year: 2019).*
Y. Zhao, X. Xia and R. Togneri, "Applications of Deep Learning to Audio Generation," in IEEE Circuits and Systems Magazine, vol. 19, No. 4, pp. 19-38, Fourthquarter 2019, doi: 10.1109/MCAS.2019.2945210. (Year: 2019) (Year: 2019).*

* cited by examiner

*Primary Examiner* — Bharatkumar S Shah
(74) *Attorney, Agent, or Firm* — Honigman LLP; Brett A. Krueger

(57) ABSTRACT

A method of self-training WaveNet includes receiving a plurality of recorded speech samples and training a first autoregressive neural network using the plurality of recorded speech samples. The trained first autoregressive neural network is configured to output synthetic speech as an audible representations of a text input. The method further includes generating a plurality of synthetic speech samples using the trained first autoregressive neural network. The method additionally includes training a second autoregressive neural network using the plurality of synthetic speech samples from the trained first autoregressive neural network and distilling the trained second autoregressive neural network into a feedforward neural network.

18 Claims, 5 Drawing Sheets

SELF-TRAINING WAVENET FOR TEXT-TO-SPEECH

TECHNICAL FIELD

This disclosure relates to self-training WaveNet for Text-to-Speech.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models were capable of providing intelligible speech, recent advances in neural modeling of speech have significantly improved the naturalness and fidelity of synthesized speech. Yet even with these advances, often times the accuracy of these neural network models depends on the corpus of training examples that are available to teach the neural network model how to synthesize speech. As such, when a limited amount of training examples exist, neural network models lack the speech synthesis accuracy that users of speech synthesis systems expect or even demand. This may be especially true as speech synthesis systems (e.g., personal assistants) become more integrated in daily human-computer interaction.

SUMMARY

One aspect of the disclosure provides a method of self-training WaveNet. The method includes receiving, at data processing hardware, a plurality of recorded speech samples and training, by the data processing hardware, a first autoregressive neural network using the plurality of recorded speech samples. The trained first autoregressive neural network is configured to output synthetic speech as an audible representations of a text input. The method further includes generating, by the data processing hardware, a plurality of synthetic speech samples using the trained first autoregressive neural network. The method additionally includes training, by the data processing hardware, a second autoregressive neural network using the plurality of synthetic speech samples from the trained first autoregressive neural network and distilling, by the data processing hardware, the trained second autoregressive neural network into a feedforward neural network.

Another aspect of the disclosure provides another method of self-training WaveNet. The method includes receiving, at data processing hardware, a plurality of recorded speech samples and training, by the data processing hardware, an autoregressive neural network using the plurality of recorded speech samples. The trained autoregressive neural network is configured to output synthetic speech as an audible representations of a text input. The method further includes generating, by the data processing hardware, a plurality of synthetic speech samples using the trained autoregressive neural network. The method additionally includes distilling, by the data processing hardware, the trained autoregressive neural network into a feedforward neural network based on the plurality of synthetic speech samples.

Yet another aspect of the disclosure provides a self-training WaveNet system. The system includes data processing hardware and memory hardware in communication with the data processing hardware. The memory hardware stores instructions that when executed on the data processing hardware cause the data processing hardware to perform operations. The operations include receiving a plurality of recorded speech samples and training a first autoregressive neural network using the plurality of recorded speech samples. The trained first autoregressive neural network is configured to output synthetic speech as an audible representations of a text input. The operations further include generating a plurality of synthetic speech samples using the trained first autoregressive neural network. The operations additionally includes training a second autoregressive neural network using the plurality of synthetic speech samples from the trained first autoregressive neural network and distilling the trained second autoregressive neural network into a feedforward neural network.

Implementations of any of the disclosures may include one or more of the following optional features. In some implementations, the second autoregressive neural network includes a different autoregressive neural network than the first autoregressive neural network or the same autoregressive neural network as the first autoregressive neural network. When the first and second autoregressive neural networks are the same, training the second autoregressive neural network using the plurality of synthetic speech samples includes re-training the first autoregressive neural network using the plurality of synthetic speech samples. In some examples, the plurality of recorded speech samples include a respective number of recorded speech samples and the plurality of synthetic speech samples include a respective number of synthetic speech samples, the respective number of recorded speech samples less than the respective number of synthetic speech samples. In these examples, the respective number of synthetic speech samples may be at least one multiple greater than the respective number of recorded speech samples.

In some configurations, distilling the trained second autoregressive neural network into a feedforward neural network includes training the feedforward neural network based on a probability distribution from the trained second autoregressive neural network. In these configurations, training the feedforward neural network includes optimizing a loss function based on a Kullback-Leibler (KL) divergence between the feedforward neural network and the second autoregressive neural network. The loss function may include a weighted sum of the KL divergence between the feedforward neural network and the second autoregressive neural network, a mean squared error, a phoneme classification error, and a contrastive loss.

In some implementations, the feedforward neural network is configured to output synthetic speech without knowledge of one or more prior synthetic speech outputs. Each of the second autoregressive neural network and the feedforward network may include a plurality of dilated residual blocks where each dilated residual block includes layers of dilated convolutions. The feedforward network may include a plurality of inverse autoregressive flows (IAF). When the feedforward network includes a plurality of inverse autoregressive flows (IAF), each IAF flow of the plurality of IAF flows include one or more dialed residual blocks where each dilated residual block includes layers of dilated convolutions.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
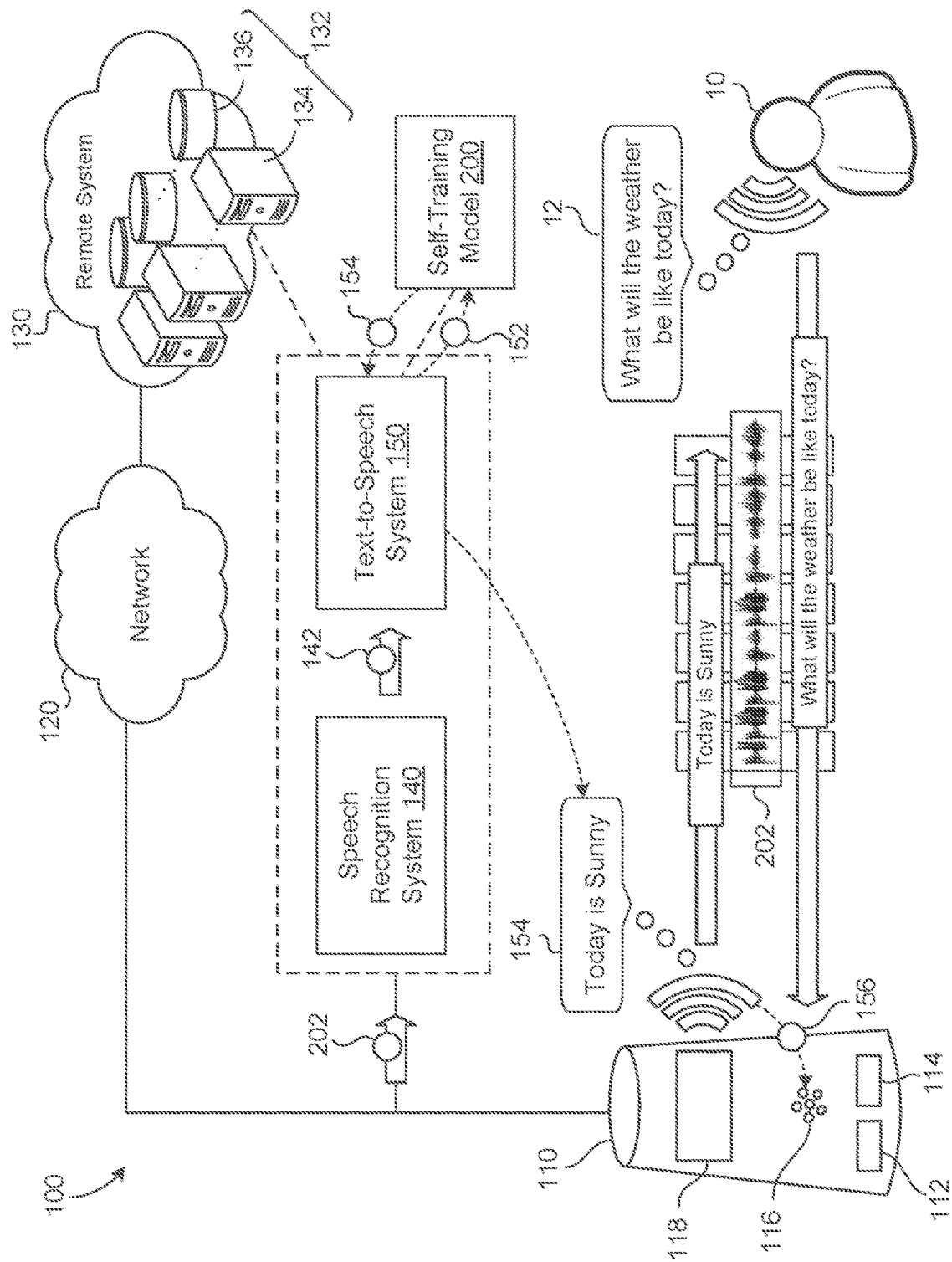
FIG. 1 is a schematic view of an example speech environment.

Deep neural networks have increasingly been used to advance an ability of a computing device to understand natural speech. Yet in addition to understanding natural speech, people often interact with computing devices with the expectation that the computing device (e.g., a speech-enabled device) generates synthesized speech as a response. For instance, a user of speech-enabled device submits a query to the speech-enabled device or a request that the speech-enabled device generates speech based on some form of text. In order to output a response to the user, the speech-enabled device employs a speech synthesis system or text-to-speech (TTS) system. Over time, speech synthesis has shifted from concatenative or statistical parametric synthesis to synthesis performed by deep neural network models. During this shift, speech synthesis or TTS systems have evolved to produce high-fidelity audio with near human parity.

A model that has proven to be a popular choice to generate seemingly realistic speech is WaveNet. WaveNet originally referred to a deep neural network that generates raw audio waveforms. When first developed, WaveNet was a model that was fully probabilistic and autoregressive where a predictive distribution for an audio sample was conditioned on all prior audio sample distributions (i.e., used ancestral sampling). As an autoregressive network, WaveNet used dilated convolutions to model the probabilistic distribution for a speech sample. For instance, WaveNet's convolutional layers had various dilation factors to allow a receptive field to grow exponentially with depth in order to cover thousands of time steps. With convolutional layers, WaveNet is able to process its input in parallel; enabling its architecture to be trained much more quickly when compared to a recurrent neural network based model. Yet although WaveNet proved capable of modeling thousands of raw audio samples, as an autoregressive network, WaveNet proved to be too slow during inference for real-time speech synthesis. Unlike training that is able to be performed in parallel, during inference or generation of the waveform, a fully autoregressive WaveNet generates a synthesized output in a sequential fashion. For instance, WaveNet was only capable of generating speech at about 172 time steps per second. While this slower-than-real-time inference speed may be acceptable for offline synthesized speech generation, a fully autoregressive WaveNet proves too slow for real-time applications.

To remedy the slow inference speed, a parallel variation of WaveNet (referred to as Parallel WaveNet) emerged to produce audio at a rate faster than real-time speech while maintaining the high-fidelity and realistic speech manner of the original autoregressive WaveNet. To be able to generate synthesized audio during inference at real-time speech rates, Parallel WaveNet distilled an autoregressive network of the original autoregressive WaveNet into a parallel feed-forward neural network described in van den Oord, *Parallel Wave-Net: Fast High-Fidelity Speech Synthesis*, available at https://arxiv.org/pdf/1711.10433.pdf, and incorporated herein by reference. Here, the autoregressive network is referred to as a "teacher" network (or autoregressive teacher) because the feedforward network is taught by the autoregressive network; thus, the feedforward network is also referred to as a "student" network or feedforward student network. In other words, Parallel WaveNet uses an already trained autoregressive neural network as a teacher network to train the student network. In this respect, Parallel WaveNet takes advantage of the parallel training speed of the autoregressive WaveNet, but generates a feedforward network that does not rely on ancestral sampling (e.g., like the trained autoregressive teacher network). As a feedforward network, the student network is thereafter able to implicitly infer outputs of prior time steps rather than requiring actual knowledge of these outputs. With this teacher-student architecture, Parallel WaveNet is capable of generating samples at about 500,000 time steps per second; addressing the speed deficiencies of a fully autoregressive WaveNet.

Unfortunately, Parallel WaveNet is not without its shortcomings. One such shortcoming is that Parallel WaveNet requires a large amount of recorded speech data to produce high quality student networks. For instance, a single-speaker version of WaveNet has been shown to require about twenty-four hours of recorded speech to result in a high fidelity student network. Moreover, other neural vocoders, such as single-speaker Tacotron, have greater fidelity when trained on more utterances (e.g., twenty-five thousand utterances) than less utterances (e.g., fifteen thousand or even eight thousand utterances). Yet there are inevitable circumstances where a large amount of recorded speech data is not available. When the teacher network trains a student network with a small amounts of recorded speech data, the synthesized output may contain artifacts, such as static noise, which become more prominent when fewer training samples of recorded speech area available.

Since speech synthesis models do not always have the luxury of a large amount of recorded speech data, a version of WaveNet that generates high-fidelity audio from a low-data regime would increase the robustness and/or universal effectiveness of WaveNet. Here, in order to further evolve WaveNet to be effective with a low-data regime, a self-training model leverages the high-fidelity audio produced by an autoregressive WaveNet and the faster-than-real-time synthesis capability of Parallel WaveNet. In other words, in low-data regimes, a Parallel WaveNet may be trained on speech synthesized by an autoregressive WaveNet teacher to form a self-training model (i.e., a self-training WaveNet). By generating high-fidelity synthetic speech data from an autoregressive teacher network to train a student network, the self-training WaveNet is able to train the student network without compromising fidelity when low amounts of recorded speech are available. Here, self-training refers to the technique of using an already trained system to generate outputs on unseen input examples and using these generated outputs as targets for subsequent training/re-training. Using a self-training approach, high fidelity synthetic speech samples produced by a trained autoregressive teacher network train (or distill) the feedforward student network. This approach takes advantage of the fact that the autoregressive WaveNet (e.g., the autoregressive teacher network) produces high quality synthetic examples; allowing a self-training technique to not further degrade the student network in response to the synthetic examples.

Referring to FIG. 1, in some implementations, a speech environment 100 includes a user 10 communicating a spoken utterance 12 to a speech-enabled device 110 (also referred to as a device 110 or a user device 110). The user 10 (i.e., speaker of the utterance 12) may speak the utterance 12 as a query or a command to solicit a response from the device 110. The device 110 is configured to capture sounds from one or more users 10 within the speech environment 100. Here, the audio sounds may refer to a spoken utterance 12 by the user 10 that functions as an audible query, a command for the device 110, or an audible communication captured by the device 110. Speech-enabled systems of the device 110 or associated with the device 110 may field the query for the command by answering the query and/or causing the command to be performed.

Here, the device 110 captures an audio signal 202 (also referred to as audio data) of the spoken utterance 12 by the user 10. The device 110 may correspond to any computing device associated with the user 10 and capable of receiving audio signals 202. Some examples of user devices 110 include, but are not limited to, mobile devices (e.g., mobile phones, tablets, laptops, etc.), computers, wearable devices (e.g., smart watches), smart appliances, and internet of things (IoT) devices, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations. In some examples, the device 110 includes one or more applications (i.e., software applications) where each application may utilize one or more speech processing systems 140, 150, 200 associated with device 110 to perform various functions within the application. For instance, the device 110 includes an assistant application configured to communicate synthesized playback audio 154 to the user 10 to assist the user 10 with various tasks.

The device 110 further includes an audio subsystem with an audio capturing device (e.g., a microphone) 116 for capturing and converting spoken utterances 12 within the speech environment 100 into electrical signals and a speech output device (e.g., a speaker) 118 for communicating an audible audio signal (e.g., a synthesized playback signal 154 from the device 110). While the device 110 implements a single audio capturing device 116 in the example shown, the device 110 may implement an array of audio capturing devices 116 without departing from the scope of the present disclosure, whereby one or more audio capturing devices 116 in the array may not physically reside on the device 110, but be in communication with the audio subsystem (e.g., peripherals of the device 110). For example, the device 110 may correspond to a vehicle infotainment system that leverages an array of microphones positioned throughout the vehicle.

Furthermore, the device 110 is configured to communicate via a network 120 with a remote system 130. The remote system 130 may include remote resources 132, such as remote data processing hardware 134 (e.g., remote servers or CPUs) and/or remote memory hardware 136 (e.g., remote databases or other storage hardware). The device 110 may utilize the remote resources 132 to perform various functionality related to speech processing and/or synthesized playback communication. For instance, the device 110 is configured to perform speech recognition using a speech recognition system 140 and/or conversion of text to speech using a TTS system 150 (e.g., using the self-training model 200). These systems 140, 150, 200 may reside on the device 110 (referred to as on-device systems) or reside remotely (e.g., reside on the remote system 130), but in communication with the device 110. In some examples, some of these systems 140, 150, 200 reside locally or on-device while others reside remotely. In other words, any of these systems 140, 150 200 may be local or remote in any combination. For instance, when a system 140, 150, 200 is rather large in size or processing requirements, the system 140, 150, 200 may reside in the remote system 130. Yet when the device 110 may support the size or the processing requirements of one or more systems 140, 150, 200, the one or more systems 140, 150, 200 may reside on the device 110 using the data processing hardware 112 and/or the memory hardware 114. Optionally, the one or more of the systems 140, 150, 200 may reside on both locally/on-device and remotely. For instance, one or more of the systems 140, 150, 200 may default to execute on the remote system 130 when a connection to the network 120 between the device 110 and remote system 130 is available, but when the connection is lost or the network 120 is unavailable, the systems 140, 150, 200 instead execute locally on the device 110.

A speech recognition system 140 receives an audio signal 202 as an input and transcribes that audio signal into a transcription 142 as an output. Generally speaking, by converting the audio signal 202 into a transcription 142, the speech recognition system 140 allows the device 110 to recognize when a spoken utterance 12 from the user 10 corresponds to a query, a command, or some other form of audio communication. The transcription 142 refers to a sequence of text that the device 110 may then use to generate a response to the query or the command. For instance, if the user 10 asks the device 110 the question of "what will the weather be like today," the device 110 passes the audio signal corresponding to the question "what will the weather be like today" to the speech recognition system 140. The speech recognized system 140 converts the audio signal into a transcript that includes the text of "what will the weather be like today?" The device 110 may then determine a response to the query using the text or portions of the text. For instance, in order to determine the weather for the current day (i.e., today), the device 110 passes the text (e.g., "what will the weather be like today?") or identifying portions of the text (e.g., "weather" and "today") to a search engine. The search engine may then return one or more search results that the device 110 interprets to generate a response for the user 10.

In some implementations, the device 110 or a system associated with the device 110 identifies text 152 that the device 110 will communicate to the user 10 as a response to a query of the spoken utterance 12. The device 110 may then use the TTS system 150 to convert the text 152 into corresponding synthesized playback audio 154 for the device 110 to communicate to the user 10 (e.g., audibly communicate to the user 10) as the response to the query of the spoken utterance 12. In other words, the TTS system 150 receives, as input, text 152 and converts the text 152 to an output of synthesized playback audio 154 where the synthesized playback audio 154 is an audio signal defining an audible rendition of the text 152. Here, the TTS system 150 (or other speech synthesis system) includes a self-training model 200 (e.g., the self-training model of FIG. 2) that utilizes a deep neural network (e.g., the self-training Wave-Net) to generate the synthesized playback audio 154. Once generated, the TTS system 150 communicates the synthesized playback audio 154 to the device 110 to allow the device 110 to output the synthesized playback audio 154. For instance, the device 110 outputs the synthesized playback audio 154 of "today is sunny" at a speaker 118 of the device 110.

Figure 2:
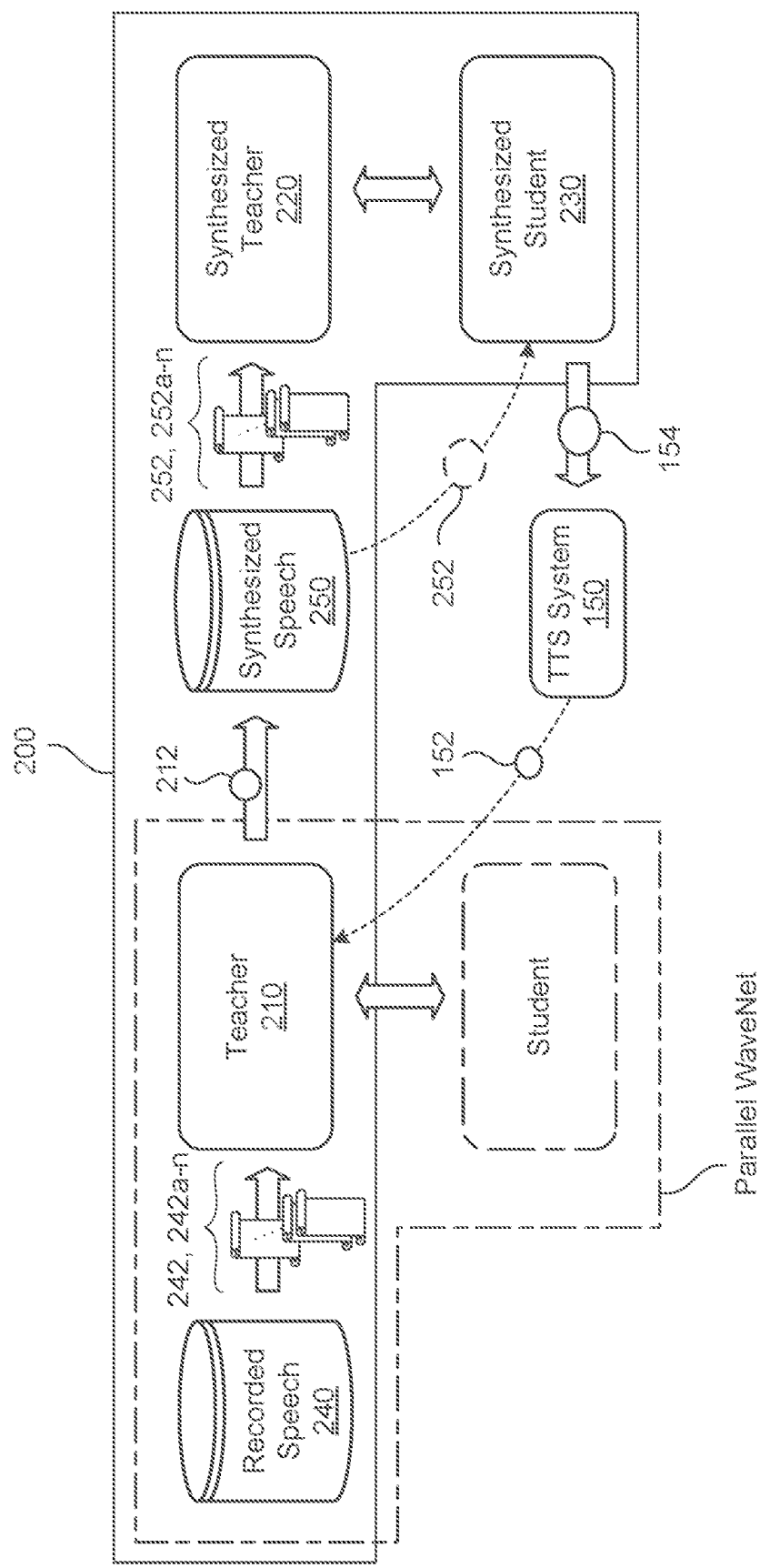
FIG. 2 is a schematic view of an example self-training model for a speech synthesis system of the speech environment of FIG. 1.

Referring to FIG. 2, the TTS system 150 includes the self-training model 200 as a neural vocoder in order to generate the synthesized playback audio 154. As a neural vocoder, the self-training model 200 may be conditioned on features that encode linguistic and/or prosodic information. Here, the linguistic conditioning may include phoneme, syllable, word, phrase, and/or utterance level features. In some examples, these features are derived through text normalization (e.g., static rule-based text normalization) in conjunction with rule-based feature computations. The prosody conditioning may be provided by an autoencoder such as a hierarchical variational autoencoder. The autoencoder may also use the linguistic conditioning to generate, as an output, a fundamental frequency per frame.

In some implementations, such as FIG. 2, the self-training model 200 includes a first teacher network 210, a second or synthesized teacher network 220, and a synthesized student network 230. Each network 210, 220, 230 may have dilated residual blocks as its constituent unit(s). In some examples, a dilated residual block includes one or more layers of convolutions. For example, the dilated residual blocks of the networks 210, 220, 230 correspond to ten layers of convolutions (e.g., increasing by a factor of two for every layer). In some configurations, the teacher networks 210, 220 include three dilated residual blocks while the student network 230 includes four inverse autoregressive flows (IAF) where each IAF may have some number of residual blocks. For instance, the first, second, and third IAFs each include one dilated block while the fourth IAF includes three dilated residual blocks.

As depicted by FIG. 2, this self-training model 200 is in contrast to a conventional Parallel WaveNet that does not train with synthesized speech. Generally, the conventional method of training Parallel WaveNet is a two-step procedure. In the first step, an autoregressive teacher network is trained to model the probability distribution of a sample based on previous samples of recorded speech. Here, since all the recorded speech samples are available, training may occur in parallel with the technique of teacher forcing. During the second step to train a conventional Parallel WaveNet, the training process distills the density distribution of the autoregressive teacher network into a feedforward student network. Distillation generally refers to a process of training a neural network using a pre-trained network. Using distillation, neurons of the pre-trained network that are less critical to a desired output (e.g., similar to deadweight) may be reduced to form a more streamlined neural network (i.e., the distilled neural network). Distillation may enable the distilled neural network to be more accurate and/or a more compact size when compared to the pre-trained network. In other words, when the pre-trained network was formed, the pre-trained network may have formed neurons that ultimately resulted in having less impact on the desired output by the time the training of the pre-trained network was complete; therefore, the pre-trained network includes neurons that may be removed or modified to reduce any detrimental impact from these neurons or to remove unnecessary neurons.

In some examples, the self-training model 200 includes a first teacher 210 that functions as an autoregressive neural network. Much like the conventional Parallel WaveNet, the first teacher 210 trains using recorded speech samples 242, 242a-n from a volume 240 (e.g., shown as a database or other type of audio data depository) of recorded speech samples 242. Here though, the self-training model 200 may be utilized when the number of recorded speech samples 242 is relatively low (i.e., a low-data regime). For instance, a low-data regime refers where the volume 240 of recorded speech samples 242 is less than twenty-five thousand samples (i.e., a healthy amount of recorded samples 242 for Parallel WaveNet), but greater than five thousand samples (i.e., an unhealthy amount of recorded samples 242 for Parallel WaveNet). In some examples, the low-data regime is between five thousand to fifteen thousand recorded speech samples 242. Even though the low-data regime has less recorded speech samples 242, the first teacher 210 trains with the recorded speech samples 242 to form a trained first teacher 210.

With the trained first teacher 210, the self-training model 200 has the trained first teacher 210 generate a volume 250 of synthetic speech samples 252, 252a-n as an output 212. In some implementations, the generation of the synthetic speech samples 252 is a one-time processing task that can be performed offline with little to no limits on the amount of synthetic speech samples 252 that the trained teacher 210 generates. In some configurations, the self-training model 200 uses the trained autoregressive teacher from Parallel WaveNet and not the feedforward student (e.g., shown as a dotted box in FIG. 2) to generate the synthetic speech samples 252 because the autoregressive teacher network 210 generates synthetic speech samples 252 having higher fidelity than the feedforward student network. Therefore, although it is possible to also generate synthetic speech samples with the feedforward student network of Parallel WaveNet, it may compromise the fidelity of the self-training model 200.

In some examples, with a TTS system 150, the self-training model 200 is configured to generate the synthetic speech samples 252 from readily available text samples (e.g., text 152 from the TTS system 150). In some configurations, the text samples may be unlabeled text samples. The teacher 210 may generate the synthetic speech samples 252 from a corpus of text samples with sufficient phonetic coverage for the language of the synthetic speech samples 252. In some examples, the synthetic speech samples 252 undergo a pruning process to prevent the synthesized student 230 from learning using a noisy or a corrupt synthetic speech sample 252 (i.e., a synthetic speech sample 252 that would be detrimental to learning). For instance, to avoid an issue where the synthetic speech samples 252 include bias with respect to phoneme distribution, a script selection methodology may be applied to the dataset of generated synthetic speech samples 252. Additionally or alternatively, during or after the process of generating the synthetic speech samples 252, the training process may generate phoneme alignments for the synthetic speech samples 252. By generating phoneme alignments for the synthetic speech samples 252, a pruning process may reject synthetic speech samples 252 that produce a phoneme alignment score below a particular threshold (i.e., minimum allowable alignment score). In other words, phoneme alignment scores may indicate which synthetic speech samples 252 may need pruning from the training set of synthetic speech samples 252 that will be used to train the synthesized teacher 220 (or, in some instances, re-train the teacher 210).

In some configurations, once the trained teacher 210 generates the synthetic speech samples 252, the model training process uses the synthetic speech samples 252 to train the synthesized teacher 220. For instance, the model training process uses a training dataset that includes synthetic speech samples 252 that survived the pruning process. Here, the training process for the synthesized teacher 220 is identical to that of the first teacher 210 except that the training process uses the synthetic speech samples 252 instead of the recorded speech samples 242. With this training process, the synthesized teacher 220 may be trained with a large set of samples (i.e., the synthetic speech samples 252) when compared to the small number of recorded speech samples 252. For instance, the teacher 210 generates upwards of twenty-five to fifty thousand synthetic speech samples while the low-data regime includes a fraction of this amount (e.g., between five thousand to fifteen thousand recorded speech samples 242); therefore, even though both the first teacher 210 and the synthesized teacher 220 are autoregressive neural networks, the synthesized teacher 220 is trained on an amount of speech data that is one or more multiples greater than the amount of speech data that trained the teacher 210.

Optionally, in some examples, the training process uses the synthetic speech samples 252 to train or to distill the student 230 without training a synthesized teacher 220. Although this approach is feasible, it may not be ideal. This is especially true since the trained teacher 210 was trained only on a relatively small amount of recorded speech samples 242 in order to generate the synthetic speech samples 252. This means that immediately training the student 230 would likely not have the level of fidelity that the synthesized student 230 has when it is trained by a teacher (e.g., the synthesized teacher 220) that has been trained with a larger data regime (e.g., the synthetic speech samples 252). Additionally or alternatively, the first teacher 210 and the second teacher or synthesized teacher 220 may be the same neural network. In other words, the synthesized teacher 220 is simply the teacher 210 that has been re-trained using the synthetic speech samples 252 such that the neural network forming the teacher 210 has then been retrained on a larger corpus of speech samples.

When the synthesized teacher 220 has been trained, the trained synthesized teacher 230 may then be distilled into the synthesized student 230. This means that the trained synthesized teacher 230 trains the synthesized student 230 according to probability distributions that correspond to synthetic speech. The training process by the trained synthesized teacher 220 distills the synthesized teacher 220 into a feedforward synthesized student 230. As a feedforward neural network, the synthesized student 230, much like a feedforward student of a Parallel WaveNet, is able to generate an output of synthesized speech (e.g., synthesized playback audio 154) without requiring knowledge of one or more prior synthesized speech outputs during inference (e.g., like an autoregressive network). Although the training process is generally described with respect to a single speaker, the training process for the model 200 may be scaled for multiple speakers. For example, when the model 200 is for multiple speakers, the synthesized teacher 220 distills a synthesized student 230 for each speaker of the multiple speakers such that the model 200 for multiple speakers includes multiple synthesized students 230 (e.g., proportional to the number of multiple speakers).

In some implementations, the training process trains a component of the model 200 by optimizing a loss function. For instance, to train either teacher model 210, 220, the training process may use a loss function represented as a negative log-likelihood of a predicted mixture distribution. In some examples, the distillation process trains the student 230 using a loss function based on a Kullback-Leibler (KL) divergence. For example, the loss function is based on the KL divergence between the student 230 (e.g., a feedforward neural network) and the synthesized teacher 220 (e.g., an autoregressive neural network trained by synthetic speech samples 252). In some configurations, the distillation process trains the student 230 with a loss function that is a weighted sum of several different loss functions (or errors), such as a KL divergence (e.g., between the student 230 and the synthesized teacher 220 distributions), a mean squared error (e.g., between predicted and target signal powers in a moving window), a phoneme classification error, and/or a contrastive loss that maximizes the difference between the KL divergence of probability distributions between the student 230 and the teacher 220 when obtained with correct conditionings and the KL divergence of probability distributions between the student 230 and the teacher 220 when obtained with incorrect conditionings.

Figure 3:
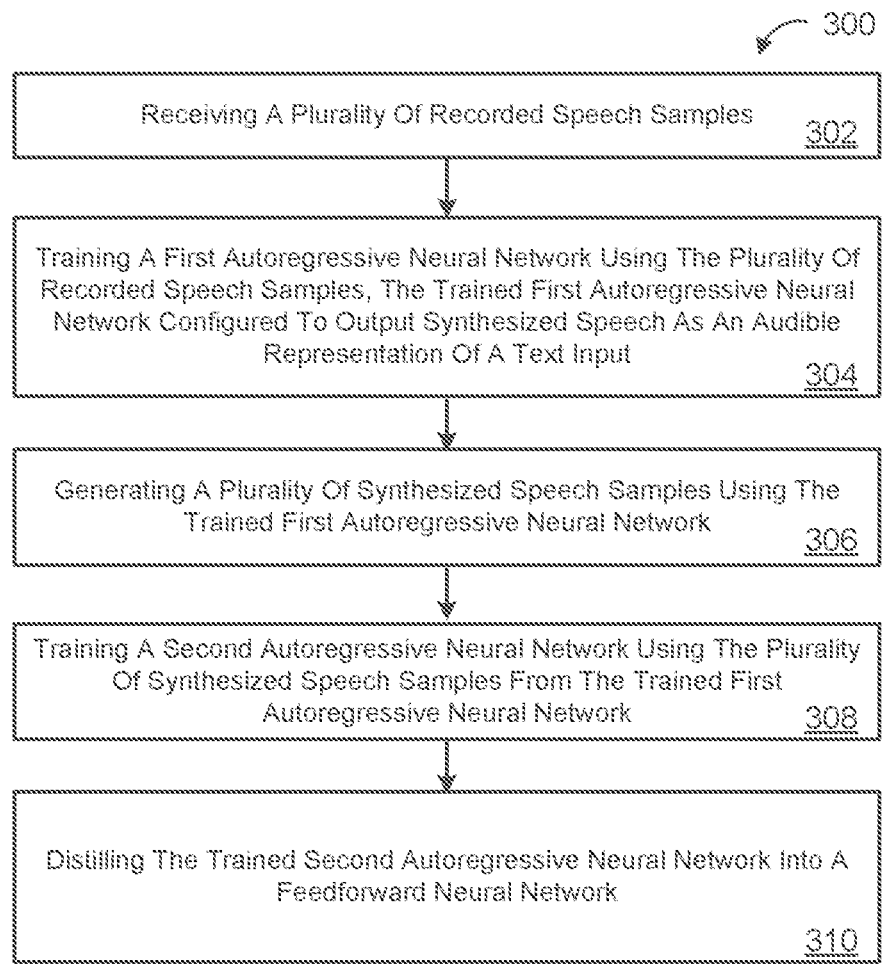
FIGS. 3 and 4 are flow charts of example arrangements of operations for methods of self-training WaveNet for text-to-speech.

FIG. 3 is a flowchart of an example arrangement of operations for a method self-training WaveNet. At operation 302, the method 300 receives a plurality of recorded speech samples 242. At operation 304, the method 300 trains a first autoregressive neural network 210 using the plurality of recorded speech samples 242. The trained first autoregressive neural network 210 is configured to output synthetic speech as an audible representations of a text input. At operation 306, the method 300 generates a plurality of synthetic speech samples 252 using the trained first autoregressive neural network 210. At operation 308, the method 300 trains a second autoregressive neural network 220 using the plurality of synthetic speech samples 252 from the trained first autoregressive neural network 210. At operation 310, the method 300 distills the trained second autoregressive neural network 220 into a feedforward neural network 230.

Figure 4:
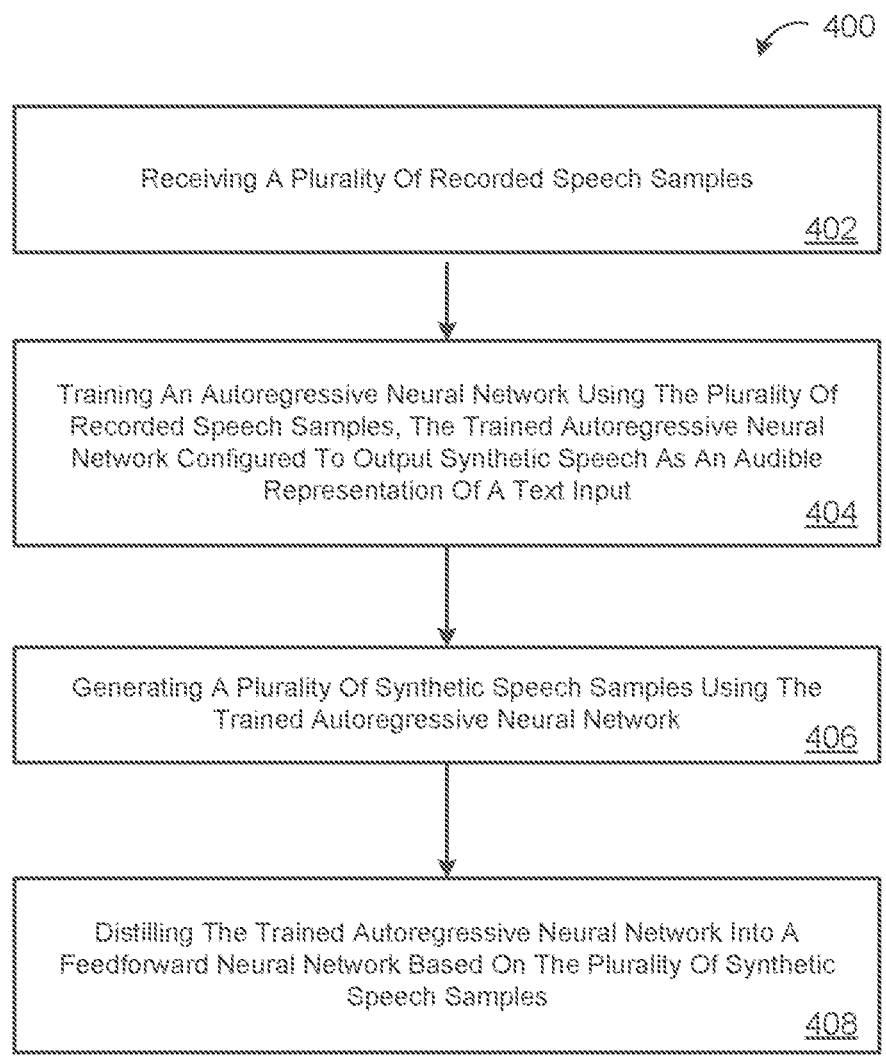

FIG. 4 is another flowchart of an example arrangement of operations for another method self-training WaveNet. At operation 402, the method 400 receives a plurality of recorded speech samples 242. At operation 404, the method 300 trains an autoregressive neural network 210 using the plurality of recorded speech samples 242. The trained autoregressive neural network 210 is configured to output synthetic speech as an audible representations of a text input. At operation 406, the method 400 generates a plurality of synthetic speech samples 252 using the trained autoregressive neural network 210. At operation 408, the method 400 distills the trained autoregressive neural network 210 into a feedforward neural network 230.

Figure 5:
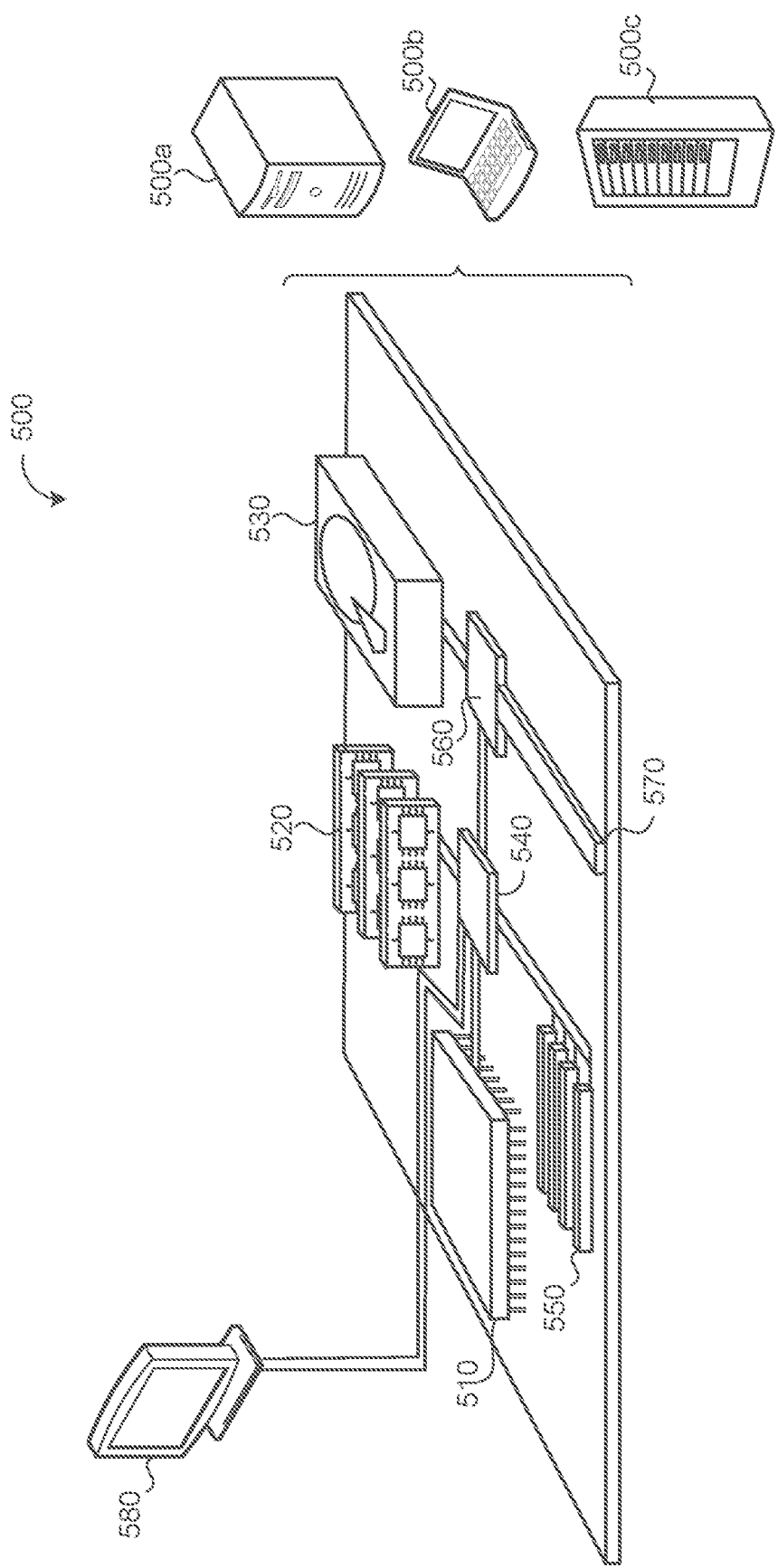
FIG. 5 is a schematic view of an example computing device that may be used to implement the systems and methods described herein.

FIG. 5 is schematic view of an example computing device 500 that may be used to implement the systems (e.g., the speech recognition system 140, the TTS system 150, and/or the self-training model 200) and methods (e.g., methods 300, 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware), memory 520 (e.g., memory hardware), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware, a plurality of recorded raw audio waveform samples of speech;
    training, by the data processing hardware, a first autoregressive neural network using the plurality of recorded raw audio waveform samples of speech, the trained first autoregressive neural network configured to output raw audio waveforms of synthetic speech as an audible representation of a text input;
    generating, by the data processing hardware, as output from the trained first autoregressive neural network, a plurality of raw audio waveform samples of synthetic speech;
    training, by the data processing hardware, a second autoregressive neural network using the plurality of raw audio waveform samples of synthetic speech generated as output from the trained first autoregressive neural network; and
    distilling, by the data processing hardware, the trained second autoregressive neural network into a feedforward neural network.

2. The method of claim 1, wherein the second autoregressive neural network comprises one of:
    a different autoregressive neural network than the first autoregressive neural network; or
    the same autoregressive neural network as the first autoregressive network, such that training the second autoregressive neural network using the plurality of synthetic speech samples comprises re-retraining the first autoregressive neural network using the plurality of synthetic speech samples.

3. The method of claim 1, wherein the plurality of recorded speech samples comprises a respective number of recorded speech samples and the plurality of synthetic speech samples comprises a respective number of synthetic speech samples, the respective number of recorded speech samples less than the respective number of synthetic speech samples.

4. The method of claim 3, wherein the respective number of synthetic speech samples is at least one multiple greater than the respective number of recorded speech samples.

5. A method comprising:
    receiving, at data processing hardware, a plurality of recorded speech samples;
    training, by the data processing hardware, a first autoregressive neural network using the plurality of recorded speech samples, the trained first autoregressive neural network configured to output synthetic speech as an audible representation of a text input;
    generating, by the data processing hardware, a plurality of synthetic speech samples using the trained first autoregressive neural network;
    training, by the data processing hardware, a second autoregressive neural network using the plurality of synthetic speech samples from the trained first autoregressive neural network; and
    distilling, by the data processing hardware, the trained second autoregressive neural network into a feedforward neural network, wherein distilling the trained second autoregressive neural network into the feedforward neural network comprises training the feedforward neural network based on a probability distribution from the trained second autoregressive neural network by optimizing a loss function based on a Kullback-Leibler (KL) divergence between the feedforward neural network and the second autoregressive neural network, wherein the loss function comprises a weighted sum of the KL divergence between the feedforward neural network and the second autoregressive neural network, a mean squared error, a phoneme classification error, and a contrastive loss.

6. The method of claim 1, wherein the feedforward neural network is configured to output synthetic speech without knowledge of one or more prior synthetic speech outputs.

7. The method of claim 1, wherein each of the second autoregressive neural network and the feedforward network comprise a plurality of dilated residual blocks, each dilated residual block comprising layers of dilated convolutions.

8. The method of claim 1, wherein the feedforward network comprises a plurality of inverse autoregressive flows (IAF).

9. The method of claim 8, wherein each IAF flow of the plurality of IAF flows comprise one or more dialed residual blocks, each dilated residual block comprising layers of dilated convolutions.

10. A system comprising:
    data processing hardware; and
    memory hardware in communication with the data processing hardware, the memory hardware storing instructions that when executed on the data processing hardware cause the data processing hardware to perform operations comprising:
    receiving a plurality of recorded raw audio waveform samples of speech;
    training a first autoregressive neural network using the plurality of recorded raw audio waveform samples of speech, the trained first autoregressive neural network configured to output raw audio waveforms of synthetic speech as an audible representation of a text input;
    generating, as output from the trained first autoregressive neural network, a plurality of raw audio waveform samples of synthetic speech;
    training a second autoregressive neural network using the plurality of raw audio waveform samples of synthetic speech generated as output from the trained first autoregressive neural network; and
    distilling the trained second autoregressive neural network into a feedforward neural network.

11. The system of claim 10, wherein the second autoregressive neural network comprises one of:
    a different autoregressive neural network than the first autoregressive neural network; or
    the same autoregressive neural network as the first autoregressive network, such that training the second autoregressive neural network using the plurality of synthetic speech samples comprises re-retraining the first autoregressive neural network using the plurality of synthetic speech samples.

12. The system of claim 10, wherein the plurality of recorded speech samples comprises a respective number of recorded speech samples and the plurality of synthetic speech samples comprises a respective number of synthetic speech samples, the respective number of recorded speech samples less than the respective number of synthetic speech samples.

13. The system of claim 12, wherein the respective number of synthetic speech samples is at least one multiple greater than the respective number of recorded speech samples.

14. A system comprising:
   data processing hardware; and
   memory hardware in communication with the data processing hardware, the memory hardware storing instructions that when executed on the data processing hardware cause the data processing hardware to perform operations comprising:
      receiving a plurality of recorded speech samples;
      training a first autoregressive neural network using the plurality of recorded speech samples, the trained first autoregressive neural network configured to output synthetic speech as an audible representation of a text input;
      generating a plurality of synthetic speech samples using the trained first autoregressive neural network;
      training a second autoregressive neural network using the plurality of synthetic speech samples from the trained first autoregressive neural network; and
      distilling the trained second autoregressive neural network into a feedforward neural network, wherein distilling the trained second autoregressive neural network into the feedforward neural network comprises training the feedforward neural network based on a probability distribution from the trained second autoregressive neural network by optimizing a loss function based on a Kullback-Leibler (KL) divergence between the feedforward neural network and the second autoregressive neural network, wherein the loss function comprises a weighted sum of the KL divergence between the feedforward neural network and the second autoregressive neural network, a mean squared error, a phoneme classification error, and a contrastive loss.

15. The system of claim 10, wherein the feedforward neural network is configured to output synthetic speech without knowledge of one or more prior synthetic speech outputs.

16. The system of claim 10, wherein each of the second autoregressive neural network and the feedforward network comprise a plurality of dilated residual blocks, each dilated residual block comprising layers of dilated convolutions.

17. The system of claim 10, wherein the feedforward network comprises a plurality of inverse autoregressive flows (IAF).

18. The system of claim 17, wherein each IAF flow of the plurality of IAF flows comprise one or more dialed residual blocks, each dilated residual block comprising layers of dilated convolutions.

* * * * *